Aug. 21, 1934.    R. W. HAMMITT    1,970,652
VARIABLE ANGLE GEAR DRIVE
Filed Sept. 12, 1933
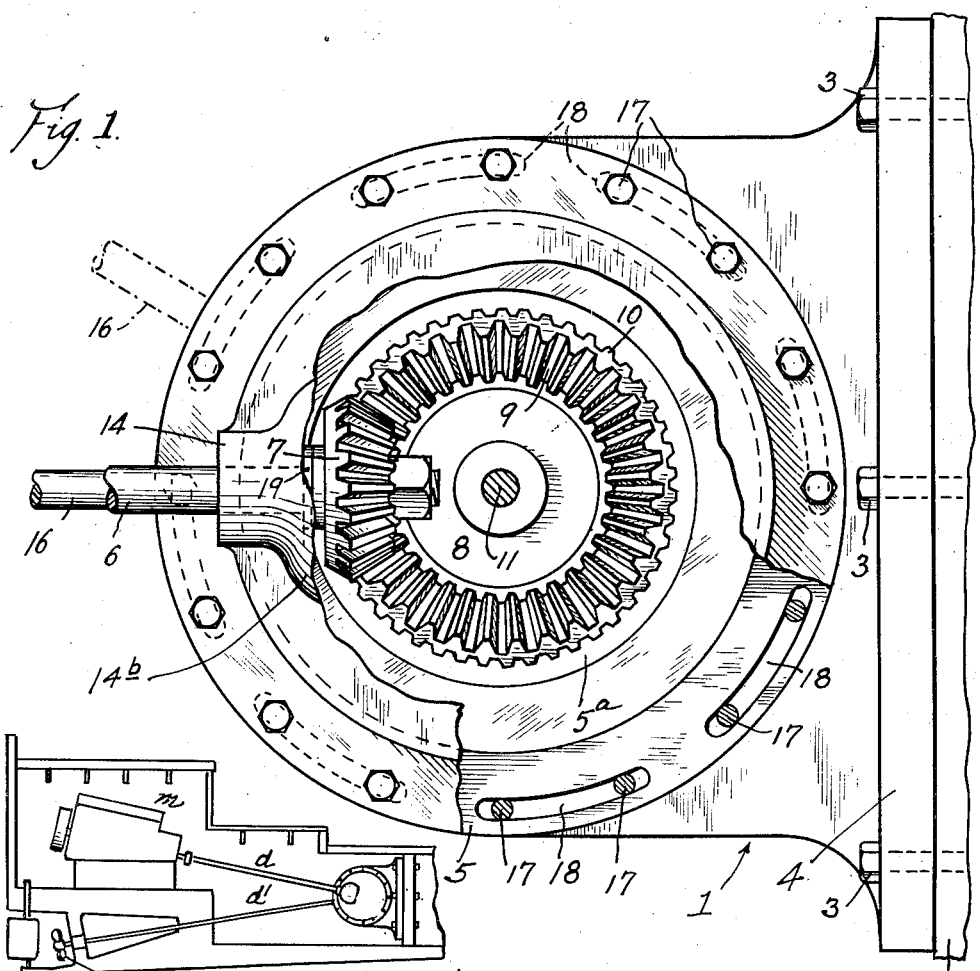
Fig. 1.
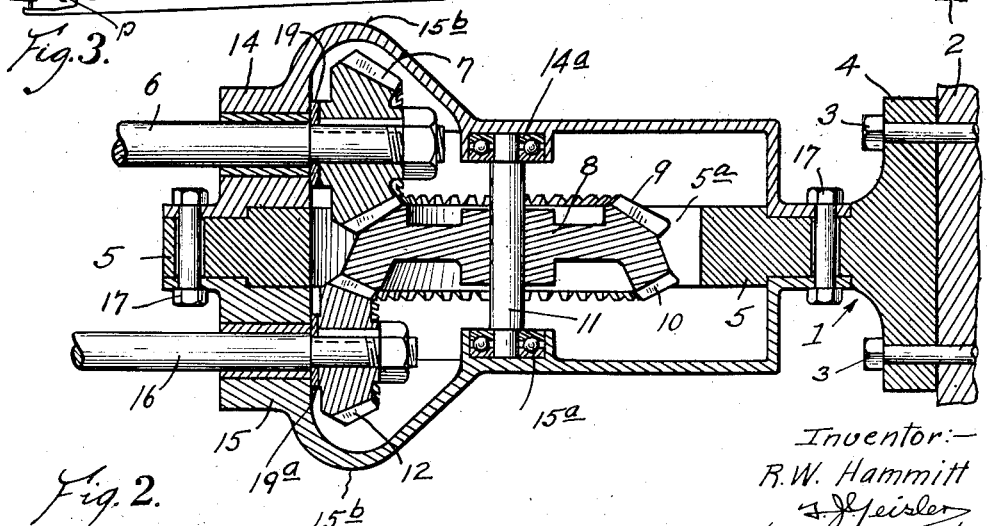
Fig. 3.
Fig. 2.
Inventor:—
R. W. Hammitt
by J. J. Geisler
Atty Patented Aug. 21, 1934

1,970,652

UNITED STATES PATENT OFFICE 1,970,652

VARIABLE ANGLE GEAR DRIVE

Ralph W. Hammitt, Everett, Wash.

Application September 12, 1933, Serial No. 689,093

1 Claim. (Cl. 74—385)

The object of my invention is to provide a simple, sturdy gear-drive comprising two shafts carrying meshing gears, and adjustable to any convenient angle with each other. As one example of the use of my device, it is very convenient for a motor boat, for which purpose the two shafts of my drive may be arranged to form a V with each other; in that way economizing the space in the stern, since the motor $m$ may be located directly over the propeller and the driving shafts geared together under the flooring of the cabin, as illustrated by Fig. 3.

The construction and operation of my gear drive will be readily understood from the accompanying drawing hereinafter fully described.

In said drawing:

Fig. 1 shows a side elevation of my gear drive with the near half of the housing in part broken away; the two shafts being shown in horizontal alinement by full lines, with one of the shafts indicated in its angular position in dotted outline; and Fig. 2 shows a horizontal section taken thru the axis of rotation of the shaft carrying the intermediate gear of the train of gears, such shaft, and the shafts of the relatively adjustable driving and driven shafts being shown in full lines.

My entire gear drive is assembled upon a bracket or supporting element 1 having an annular straight portion 5 which has a central opening 5a and a base 4 adapted to be attached to any support 2 by means of bolts 3. The said straight portion 5 is provided with marginal elongate slots 18.

A housing consisting of two halves 14 and 15 is secured on said slotted straight portion 5 of the bracket 1 by bolts 17, to form a rigid gearbox, and thus said housing halves are adapted for relative rotary adjustment about a common axis.

The driving and driven shafts may be changed by removing the bolts 17, then sliding housing halves 14 and 15 into the desired relative positions, and then securing the parts as so arranged by replacing the bolts 17.

A driving shaft 6 on which a pinion 7 is removably keyed, is journaled in the offset portion 14b of the housing half 14, and is assumed to be rotated by an engine or motor, not shown. A thrust collar 19 assists in holding pinion 7 in position. A driven shaft 16 on which a pinion 12 is removably keyed is journaled in the offset portion 15b of the housing half 15.

In the central opening of the annular straight portion 5 of the bracket 1 is located an intermediate gear 8 provided on its opposite faces with bevel gear teeth 9, 10. The intermediate gear 8 is keyed to an intermediate shaft 11 extending transversely thru said opening 5a and is journaled in bearings 14a and 15a supported by the housing halves 14 and 15.

The gear teeth 10 of said intermediate gear 8 mesh with and rotate the pinion 12, which is held in position by a thrust collar 19a. Thus the rotation of driving shaft 6 is transmitted thru pinion 7, intermediate gear 8 and pinion 12 to the driven shaft 16.

The annular straight portion 5 of the bracket 1 is provided with elongate marginal slots 18, as mentioned, in which bolts 17 are fastened. By loosening the bolts the two halves 14, 15 of the housing, and therewith the driving and driven shafts 6 and 16, may be arranged at any convenient angle for transmitting the power from the motor to the operated device as illustrated by Fig. 3.

While the shaft speeds, as shown in Figs. 1 and 2 are geared in the ratio of 1 to 2, of course any predetermined transmitted speed of rotation may be attained by changing the proportions of the pinions and intermediate gear.

I claim:

A variable angle gear drive comprising a bracket including a sole provided with a central opening and marginal, elongated slots concentric with the center of said opening, two housing halves adjustably mounted upon opposite sides, respectively, of said sole by bolts in said slots, said housing halves provided with said registering interior shaft bearings aligned with said center, a shaft located in said central opening journaled in said shaft-bearings, a bevel gear carried by said shaft, such gear provided with gear teeth on its opposite faces, each of said housing halves further provided with exterior offset portions, shaft-bearings located in each of said portions, a driving shaft and a driven shaft journaled, respectively, in said offset portions of said housing halves, and pinions carried by said driving and driven shafts, meshing with said bevel gear, respectively.

RALPH W. HAMMITT.